(12) United States Patent
Da Silva et al.

(10) Patent No.: US 10,027,774 B2
(45) Date of Patent: Jul. 17, 2018

(54) INFORMATION ON NAVIGATION BEHAVIOR OF WEB PAGE USERS

(71) Applicant: Telefonaktiebolaget LM Ericsson (publ), Stockholm (SE)

(72) Inventors: Icaro L. J. Da Silva, Bromma (SE); Åsa Bertze, Spånga (SE); Jing Fu, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 187 days.

(21) Appl. No.: 15/026,523

(22) PCT Filed: Oct. 15, 2013

(86) PCT No.: PCT/EP2013/071497
§ 371 (c)(1),
(2) Date: Mar. 31, 2016

(87) PCT Pub. No.: WO2015/055231
PCT Pub. Date: Apr. 23, 2015

(65) Prior Publication Data
US 2016/0234324 A1 Aug. 11, 2016

(51) Int. Cl.
*G06F 15/173* (2006.01)
*H04L 29/08* (2006.01)
(Continued)

(52) U.S. Cl.
CPC ............ *H04L 67/22* (2013.01); *G06Q 30/02* (2013.01); *H04L 43/028* (2013.01); *H04L 67/02* (2013.01); *H04L 67/142* (2013.01)

(58) Field of Classification Search
CPC ..... H04L 67/22; H04L 43/028; H04L 67/142; H04L 67/02; G06Q 30/02
(Continued)

(56) References Cited

U.S. PATENT DOCUMENTS

| 8,364,682 B1 * | 1/2013 | Gershony | G06Q 30/02 707/739 |
| 2003/0013431 A1 * | 1/2003 | O'Hare | H04L 29/06 455/412.1 |

(Continued)

FOREIGN PATENT DOCUMENTS

EP 2 498 475 A1 9/2012

OTHER PUBLICATIONS

International Search Report and Written Opinion of the International Searching Authority, Application No. PCT/EP2013/071497, dated Feb. 3, 2014.
(Continued)

*Primary Examiner* — Chris Parry
*Assistant Examiner* — Weiwei Stiltner
(74) *Attorney, Agent, or Firm* — Sage Patent Group

(57) ABSTRACT

A method of obtaining information on navigation behavior of users accessing web pages, includes obtaining information on web page sessions and correlating the information of at least two web page sessions for one user based on the obtained information on web page sessions. The method further includes extracting information on links from the correlated information of the at least two web page sessions, and inferring information on navigation behavior of the user based on the extracted information on links and the correlated information of the at least two web page sessions for one user.

24 Claims, 4 Drawing Sheets

(51) Int. Cl.
G06Q 30/02 (2012.01)
H04L 12/26 (2006.01)
(58) Field of Classification Search
USPC .......................................... 709/224
See application file for complete search history.

(56) References Cited

U.S. PATENT DOCUMENTS

| | | | |
|---|---|---|---|
| 2004/0073644 A1 | 4/2004 | Koch et al. | |
| 2011/0082858 A1 | 4/2011 | Yu et al. | |
| 2011/0208850 A1* | 8/2011 | Sheleheda | G06F 17/30867 709/223 |
| 2013/0132508 A1 | 5/2013 | Lucash | |
| 2013/0238473 A1* | 9/2013 | Fan | G06Q 30/04 705/34 |
| 2014/0379893 A1* | 12/2014 | Kannan | H04L 67/22 709/224 |

OTHER PUBLICATIONS

Facebook, "Protecting Privacy with Referrers", May 24, 2010, downloaded Mar. 30, 2016 from https://www.facebook.com/notes/facebook-engineering/protecting-privacy-with-referrers/392382738919,5 pp.

Fielding et al., "Hypertext Transfer Protocol—HTTP/1.1", Network Working Group, Request for Comments: 2616, Category: Standards Track, Jun. 1999, 165 pp.

Google, "Acquisition reports—Analytics Help", downloaded Mar. 30, 2016 from https://support.google.com/analytics/topic/3125765?hl=en&rd=2, 3 pp.

Madrigal, "Dark Social: We Have the Whole History of the Web Wrong", *The Atlantic*, Oct. 12, 2016, downloaded Mar. 30, 2016 from http://www.theatlantic.com/technology/archive/2012/10/dark-social-we-have-the-whole-history-of-the-web-wrong/263523/, 7 pp.

Sullivan, "Dark Google: One Year Since Search Terms Went 'Not Provided'", Oct. 19, 2012, downloaded Mar. 30, 2016 from http://marketingland.com/dark-google-search-terms-not-provided-one-year-later-24341, 7 pp.

Sullivan, "Firefox 14 Now Encrypts Google Searches, but Search Terms Still Will 'Leak' Out", Jul. 17, 2012, downloaded Mar. 30, 2016 from http://searchengineland.com/firefox-14-now-encrypts-google-searches-but-search-terms-still-will-leak-out-127831, 7 pp.

Sullivan, "The Death of Web Analytics? An Ode to the Threatened Referrer", May 25, 2010, downloaded Mar. 30, 2016 from http://searchengineland.com/the-death-of-web-analytics-an-ode-to-the-referrer-42875, 7 pp.

Wikipedia, the free encyclopedia, "HTTP referrer", downloaded Mar. 30, 2016 from https://en.wikipedia.org/wiki/HTTP_referer, 4 pp.

* cited by examiner

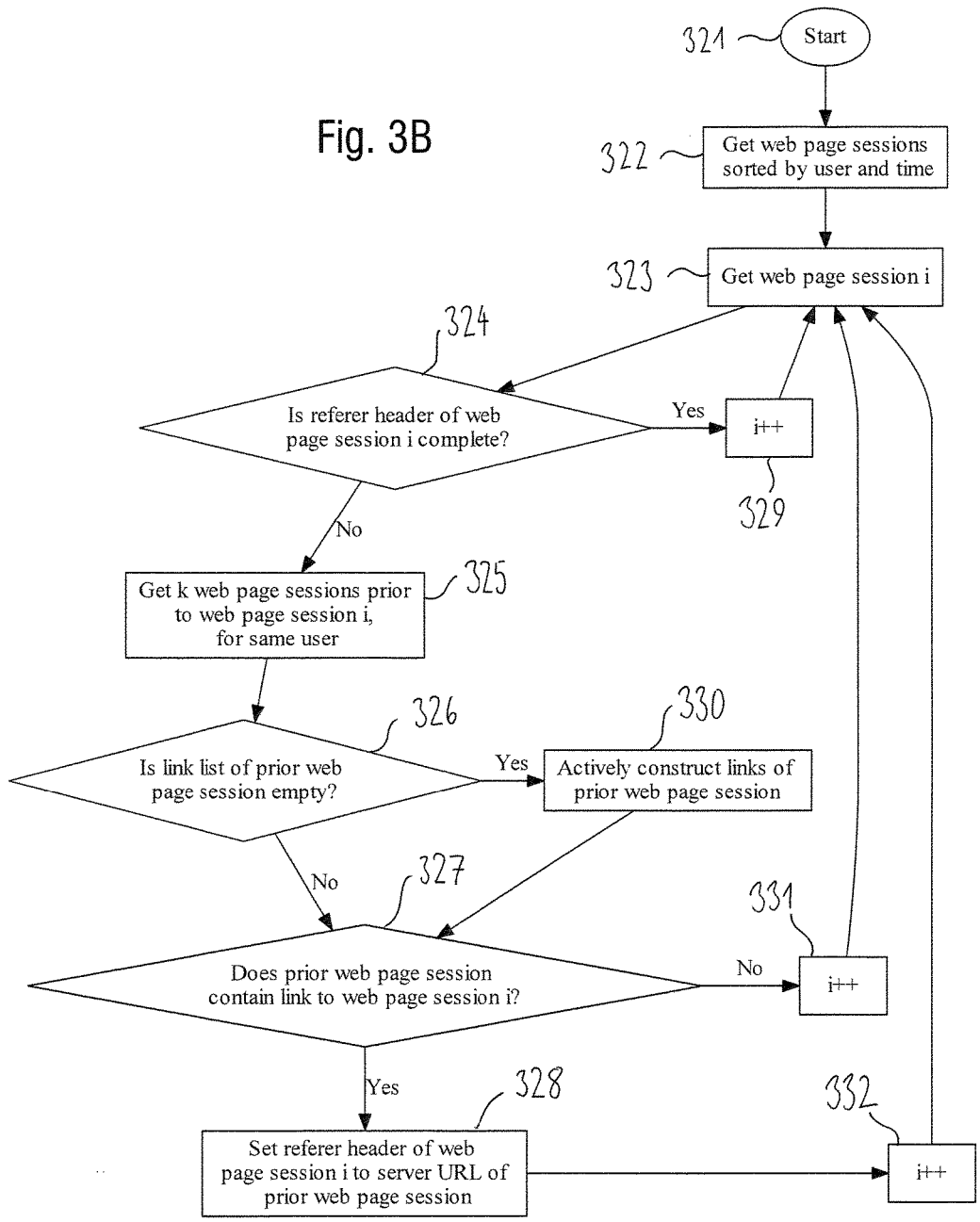

INFORMATION ON NAVIGATION BEHAVIOR OF WEB PAGE USERS

CROSS REFERENCE TO RELATED APPLICATION

This application is a 35 U.S.C. § 371 national stage application of PCT International Application No. PCT/EP2013/071497, filed on Oct. 15, 2013, the disclosure and content of which is incorporated by reference herein in its entirety. The above-referenced PCT International Application was published in the English language as International Publication No. WO 2015/055231 A1 on Apr. 23, 2015.

TECHNICAL FIELD

The present invention relates to obtaining information on navigation behavior of users accessing web pages. Specifically, the present invention relates to corresponding methods, network entities, computer programs and computer program products. The present invention also relates to obtaining information on links contained in one web page and how web page users accessing this web page use these links to navigate to other web pages.

BACKGROUND

The use of the world wide web (WWW) has become an everyday activity all over the world. Usually, web users access web content as so-called web pages by specifying a corresponding address in some kind of user terminal. Conventional access terminals may feature one or more applications (software) for accessing web pages, e.g. in the form of so-called browsers. These browsers handle the request for specified web content and the content's display to and interaction with the user. Web content is usually organized in the form of said web pages that can be individually addressed and accessed by specifying their respective web addresses.

The involved hardware equipment can likewise assume any suitable form, including individual personal computers (PCs), network/internet computers, laptops, notebooks, mobile phones, smart phones, personal digital assistance (PDAs), and the like. All these devices provide processing, communication, and memory resources for implementing the desired application for accessing the web content.

Apart from an explicit specification of a desired web page by means of a corresponding web address, there are of course other ways to access web pages without the need for knowing the respective web page's address. Most notably, one (source) web page can provide a so-called link which can be selected by a user for instructing the access equipment (e.g. browser) to access another (target) web page. In other words, the link in the source web page "points" to the target web page. For this purpose, the link usually also comprises the web address of the target web page. Usually, the user accesses the referred web page by clicking or selecting the link on the browser's user interface (mouse, touch screen, and the like).

One common way for addressing web pages is the definition of locations where the corresponding content is stored. The internet with its so-called internet protocol (IP) provides the related IP addresses that are intended to identify one unique storage location. Since such IP addresses are in the form of several tuples of numbers, they are difficult to memorize and are usually not suitable for everyday public use. However, there exist the concept of the so-called domain name servers (DNS) that can translate plain text addresses into their associated IP address. In this way, there is an easy means available for accessing a web page by associating its content to a plain text address, such as "www.nasa.gov". A link may thus contain this plain text address specification (or the corresponding IP address) and some kind of identifier that is presented to the user. Naturally, the identifier can coincide with the plain text address (e.g. the user may be fully aware that "www.nasa.gov" leads to the NASA home page).

With the increased use of the WWW it became also more and more important to obtain information on the navigation behavior of users accessing web pages. Generally, the term navigation refers to the user's actions in connection with selecting, requesting, and accessing web pages. For example, a user navigates through web content by accessing a first web page and then, possibly following a link contained in that first web page, accessing a different second web page. It should be clear that information on such user navigation behavior can be of major importance in the context of billing and/or awarding users and/or web page owners for their use and contributions to the world wide web. This information can be valuable at both an individual level (i.e. per user) or at a large scale as collective data in the sense of indicating how many users followed which link in what source web page.

For example, one web page owner may operate one or more web page(s) with various links to other web pages. Once the web page owner succeeds in attracting many users that access the web page and follow the respective links, the owners of the referenced (linked) web pages may enjoy a substantial benefit by having the users visited their sites and accessed their web pages. However, there can only be sensible and appropriate compensation amongst the involved parties (owners, operators, etc.) if there is reliable information on the corresponding navigation behavior of the users that reflects—at least to some extent—a more or less accurate figure on what (source) web page "brings" users to other (target) web page.

The routines and protocols employed for conveying content across the world wide web already provide mechanisms for obtaining such information on the user's navigation behavior. One widely used protocol is the so-called hyper-text transfer protocol (HTTP) that handles data exchange between a source (server) and a requester (user) for conveying web content. HTTP also provides a so-called referrer header that carries information on what target web page was referenced by what source web page. Intercepting this information naturally allows one to collect information on what web pages successfully made users visit other web pages. At the same time, however, concerns on confidentiality and user privacy, recently resulted in a decreased use and reliability of the HTTP referrer header and other existing tools for obtaining information on user navigation behavior. Specifically, web site owners, network operators, and/or browsers may interfere with the exchanged information so as to filter out more and more information that could be used for such purposes.

Furthermore, the number of web site owners that blank out at least a part of the information contained in the HTTP referrer header is increasing. Therefore, the analysis of the information contained in the HTTP referrer header may no longer be—despite being still present—a reliable means for obtaining information on user navigation behavior. At the same time, however, such information will remain important since web page owners and network operators will have continuous interest on what web pages are able to successfully bring users to visit other web pages.

There is therefore a need for a way of obtaining information on user navigation behavior that is more independent from the conventionally available mechanisms and information. At the same time, there is a need for efficient implementation with respect to the involved processing and communication resources, since the amount of exchanged world wide web data is enormous. In particular, there is the need for an efficient implementation of an independent way to obtain information on navigation behavior of users accessing web pages.

SUMMARY

The above-mentioned objects and problems are solved by the subject matter of the independent claims. Further preferred embodiments are defined in the dependent claims.

According to one aspect of the present invention, there is provided a method of obtaining information on navigation behavior of users accessing web pages, the method comprising the steps of obtaining information on web page sessions; correlating information of at least two web page sessions for one user from the obtained information; extracting information on links from the correlated information of the at least two web page sessions; and inferring information on navigation behavior of the user based on the extracted information and the correlated information.

According to another aspect of the present invention, there is provided an entity for obtaining information on navigation behavior of users accessing web pages, the entity comprising processing resources being configured to obtain information on web page sessions; correlate information of at least two web page sessions for one user from the obtained information; extract information on links from the correlated information of the at least two web page sessions; and to infer information on navigation behavior of the user based on the extracted information and the correlated information.

According to other aspects of the present invention, there are provided corresponding computer programs, computer program products, and systems that comprise a user terminal and an entity of at least one of the present entity embodiments.

BRIEF DESCRIPTION OF THE DRAWINGS

Embodiments of the present invention, which are presented for better understanding the inventive concepts and which are not the same as limiting the invention, will now be described with reference to the figures in which:

FIGS. 3A and 3B show flow charts of method embodiments of the present invention.

DETAILED DESCRIPTION

Figure 1A:
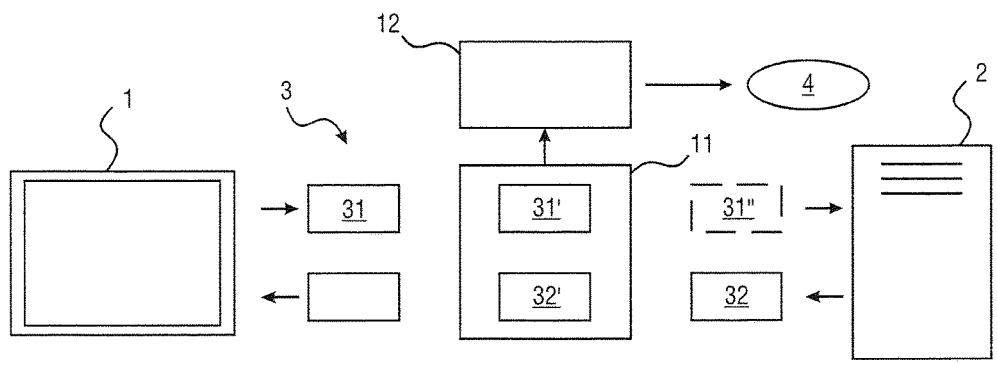
FIGS. 1A to 1O show schematic views of obtaining information on navigation behaviour in various system configurations according to system embodiments of the present invention.

FIG. 1A shows a schematic view of obtaining information on navigation behavior in a system configuration according to an embodiment of the present invention. The shown system involves a user terminal 1 configured to access web content in the form of web pages. The user terminal 1 may take one of many common forms, including PCs, laptop computers, mobile phones, smart phones, and the like. Usually, a browser application (software) is executed with the processing and memory resources of the user terminal 1. This browser software presents on a user interface of the user terminal 1 the content of the web page in form of text, images, graphic elements, animations, sound/music, and the like. By means of the operation elements of the user terminal 1, the user can interact with the web content including scrolling the field of view of the web page, magnifying or downscaling of the displayed content, and selecting links that may lead to other parts of the same web page or to other web pages. Common input means include keyboards, mice and other pointing devices, touch screens, and the like.

The corresponding data of the web content, and with it the web page(s), originate from a server 2, wherein said server 2 can likewise take one of many forms, for example the one of an individual computer that comprises corresponding processing, communication, and memory resources for storing and delivering the respective web content on request. However, server 2 may also take a form configured as virtual machine (WM) running on dedicated and/or distributed hardware resources of a data center.

According to this embodiment, the user terminal 1 requests web content in the form of accessing a web page that has an address pointing to server 2. In response, server 2 conveys the content of the web page to user terminal 1 where the corresponding application (browser) processes the received information and displays, plays back, or—generally—renders the content to the user. The user can then interact and the browser software can again contact server 2 or other servers in response to the users' actions and requests.

Generally, the data and information exchanged by user terminal 1 and server 2 is handled by a communication channel 3. Usually, this channel 3 involves the Internet and one or more access networks toward the respective sites of the user terminal 1 and the server 2. These access networks may comprise local area networks (LAN), wireless local area networks (WLAN), asynchronous digital subscriber line (ADSL) networks, mobile communication networks, such as LTE, UMTS, GPRS, GSM, PCS, and related networks. Each involved network or subpart of the communication channel 3 may employ its own techniques, routers, and protocols for conveying data. However, there is usually some kind of common high level protocols defining in some way or another, data units 31, 32. In the example of the internet protocol IP, these data units 31, 32 are usually referred to as so-called packets. Each of these data units (packets) includes header data for allowing correct routing of the unit/packet within the given network and, of course, the payload data that conveys some part or all of the respectively requested web content.

Usually, a web session is initiated by requesting some web content (e.g. specifying an address of a web page and instructing a browser to access, retrieve, and display the web page). In response, the responsible server 2 provides the data and information that is associated with the requested web content/page. In general, data units/packets that originate from the user terminal 1 are denoted by reference numerals 31, 31', and data units/packets destined to the user terminal 1 are denoted by reference numerals 32, 32', 32". In the shown example of FIG. 1A, therefore, the web session may be initiated by sending a request in form of one or more data units/packets 32, 32'. The responsible server 2 answers and provides the content in the form of data units/packets 31, 31', 31".

Along the present embodiment, inspection means 11 are provided for obtaining information on web page sessions. More specifically, these inspection means 11 analyze the data exchanged between user terminal 1 and server 2. Specifically, this analysis may take place on a data unit/packet level so that one or more individual data unit/packet(s) 31'/32' are analyzed. For example, packet 32' travels from the user terminal 1 to the server 2 comprising a request for a specific web page being located (stored) at server 2. In response, server 2 conveys the content as packet 32' to the terminal 1. Examples for implementing the inspection means 11 for obtaining the information on web page sessions include the technique of so-called deep packet inspection (DPI). Such techniques involve analyzing the data contained in the packets for looking for information on contained links and/or web page requests.

If it is assumed that packet 32' is subject to instantaneous analysis by the inspection means 11 and if this packet 32' comprises information on a web page defining links to other web pages this information on what source web page references what target web pages can be forwarded to a further processing entity 12. If, at a later stage, the user of terminal 1 accesses one of the referenced (by the previously received links) web pages, the corresponding request may be again identified in a second packet 31' originating from terminal 1. In this later case, the second packet 31' may not be forwarded as packet 31" to server 2, but to another server or entity within the network that allows for access to the other web page.

The obtained information on web page sessions is forwarded to a processing entity 12 that is configured to correlate information of at least two web page sessions for one user from the obtained information. In other words, intercepted requests or link information are correlated on a user basis, which can be effected by considering the sender IP addresses from packets 31, 31', 31", and/or the destination IP addresses of packets 32, 32'. Since the IP address of one user terminal 1 may change over time—even during one session—this process may involve consulting address change logs that allow for tracing the varying IP addresses for one same user terminal 1.

basis or in any other suitable collective, summarized, or statistical form.

Figure 1B:
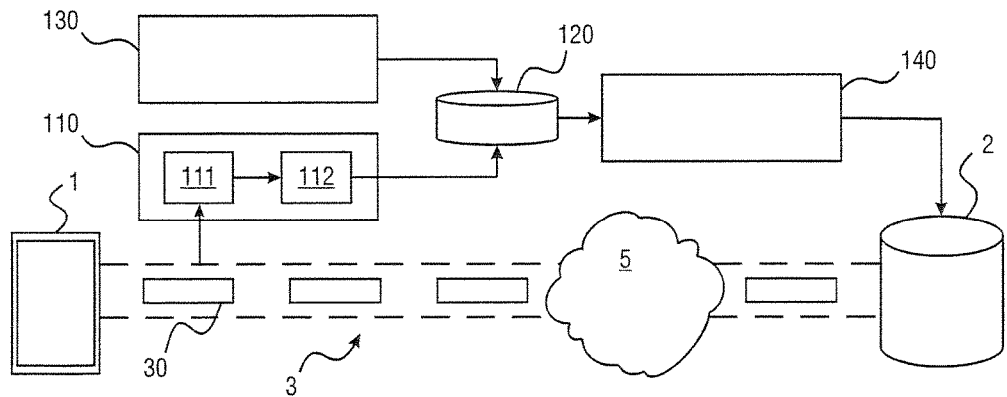

FIG. 1B shows a schematic view of obtaining information on navigation behavior in another system configuration according to a further embodiment of the present invention. Similarly to the configuration as described in conjunction with FIG. 1A, the system involves a user terminal 1 that accesses a web page on server 2 via a communication path 3 and the internet 5. Packets 30 are exchanged by the user terminal 1 from and to the internet 5. In this embodiment, the inspection and obtaining of the information on web page sessions take place in a so-called web session mining module 110. Generally, this embodiment provides a construction and exposure of HTTP referrer information to website owners, based on web usage mining of all web traffic passing through a content service provider's (CSP) network.

The shown web session mining module 110 is configured to collect data through a DPI probe 111 in the CSP's network, and to process HTTP header fields in module 112 for storage of the collected web session data in web data store 120. One components of the system is the HTTP referrer analytics module 130, which reads the web sessions from web data store 120, and may perform HTTP request for web content analysis, and constructs the HTTP referrer for web sessions. The constructed HTTP referrer result is written back to the web data store 120. Further, there is a HTTP referrer exposing module 140, which may read the web session referrer information from web data store 120, and expose to the HTTP referrer information to website owners.

In line with the present embodiment, the web session mining module 110 includes a capturing tool 111 with DPI to continuously capture HTTP packets passing through the CSP's network. From the captured HTTP packets, the HTTP traffic processing function 112 analyzes HTTP headers and content, and then constructs web page sessions, where each web page session is basically a web page that shows up on a user's browser (user terminal). Thereafter, these HTTP page sessions are stored into the web data store 120. An example of a session log stored into the web data store 120 is shown below, where each web session contains the following columns: Session ID, Client IP, time, Server URL, HTTP referrer and links:

| ID | Client IP | time | Server URL | HTTP referrer | Links |
|---|---|---|---|---|---|
| 1 | 10.0.0.1 | 10:00 | www.g . . . com/search?q=news | www.g . . . com | www.bbc.com news.g . . . com news.y . . . com |
| 2 | 10.0.0.1 | 10:02 | news.y . . . com | www.g . . . com/search?not_provided | news.y . . . 1 . . . news.y . . . 2 . . . |
| 3 | 10.0.0.2 | 10:01 | www.a . . . com | NULL | www.m . . . com www.b . . . com |
| 4 | 10.0.0.2 | 10:03 | www.m . . . com | NULL | www.m . . . uv . . . |

The processing entity 12 is further configured to extract information on links from the correlated information of the at least two web page sessions and to infer information on navigation behavior of the user based on the extracted information and the correlated information. For example, if one link was sent in connection with a first (source) web page to terminal 1, and then later this link is followed, i.e. the linked (target) web page is requested, part of the information on navigation behavior can be compiled. This information can be the output as data 4 on an individual (per user)

The first web session in the above shows that the client with IP address 10.0.0.1 has a web page session at 10:00. The server URL of the session is, for example, www.g . . . com/search?q=news. The HTTP referrer column shows www.g . . . com, which means that the query comes from some specific search engine (note that in general any URL entries may also have some additional characters included, such as http:// or the like at the beginning and/or end). The web session record shows also list of links that that the web page contains. In this case, it is basically a list of links from the search result on news. The second web session is from the same user with IP 10.0.0.1, with server URL news. y . . . com, the referrer of this web page session is www. g . . . com/search?not_provided, which means that the user arrived through g . . . , but the search key word is not provided. The third and fourth sessions are from the user with client IP 10.0.0.2. The referrer headers for both sessions are NULL. Probably it is the case where the browser hides HTTP referrer header. Still it could be seen that the user first visited, for example, a newspaper web page (www.a . . . com) and then the user visited, for example, some mobile phone distributor web page (www.m . . . com). Also, the outgoing links from each page are also shown. In particular, there is a link from www.a . . . com to www.m . . . com.

For each web session, the client IP can be obtainable by extracting them from IP headers. The time can be obtained by using timestamps when the packets are captured by the probe 111. The server URL of a web page session can be obtained through the HTTP request headers. The HTTP referrer information may also be available in the HTTP header if it is provided. Otherwise it can be set empty. Further, each web session may include a list of links that a web page contains. To obtain the list of links, HTTP packet content can be parsed to find out which outgoing links a web page contains. This could be done by parsing the HTML text in the packets. Parsing HTML text on all HTTP packets passing through CSP's network puts a high requirement on the DPI 111. If the DPI cannot handle this, an alternative solution is to obtain the links at the HTTP referrer analytics module 120, which will be described in greater detail in conjunction with FIG. 3B.

The HTTP referrer exposing module 140 may expose the constructed HTTP referrer info to configured website owners e.g. in sort of cloud service. There are two types of data which could be exposed through a B2B API. One is to having a streaming interface to website owners, and each analyzed web session can be thus streamed either in real time or with limited delay. Each exposed record of the data may include the web page request, the time of request, and the HTTP referrer header. It is to be noted, however, that this alternative in principle gives the web site owner access to the same type of data that if referrer headers were always present. However, this solution may imply also overriding the user/browser settings of not providing referrers on an individual basis, since the exact clickstream path of each user is reconstructed and exposed to the web site owner.

An alternative of HTTP referrer exposure, which can avoid revealing the individual user's referrer information, is aggregated referrer reporting (summaries). The information can be per URL, but aggregated for a time period, an hour, a day, or a month. Each entry may include a start time, duration (the time period), the web page URL, the total number of times the page is requested, and a listed of HTTP referrers including number of occurrences for each referrer.

For example, the below table shows that for web page news.y . . . com, there are in total 10 web page sessions between 10:00 and 11:00. Among these 10 web page sessions, 3 of them come from www.g . . . com, 5 of them come from www.y . . . com, and the remaining two are direct traffic. This type of reporting may provide the web site owner with valuable statistics about from where the users are accessing their site, while still preserving individual user privacy.

| Time | Duration | Server URL | Count | HTTP referrer list |
|------|----------|------------|-------|--------------------|
| 10:00 | 1 hour | news.y . . . com | 3 | www.g . . . com |
|  |  |  | 5 | www.y . . . com |
|  |  |  | 2 | www.x . . . |
| 10:00 | 1 hour | www.a . . . com | 2 | www.a . . . com |
|  |  |  | 1 | www.g . . . search? . . . |
| 11:10 | 1 hour | news.y . . . com | 2 | www.y . . . com |
|  |  |  | 1 | www.g . . . search? . . . |

Figure 1C:
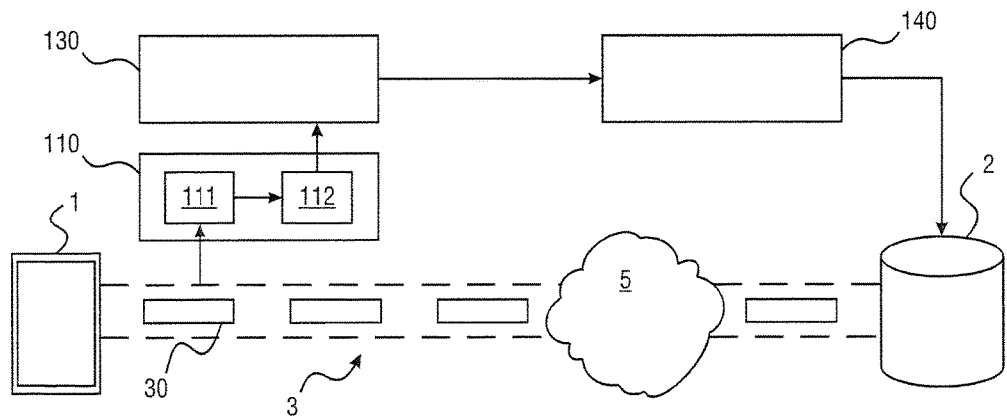

FIG. 1C shows a schematic view of obtaining information on navigation behavior in another system configuration according to a further embodiment of the present invention. Similarly to the configuration as described in conjunction with FIG. 1B, the web pages are accessed by user terminal 1 form a server 2 via a communication channel 3 and the internet 5. The shown configuration, however, considers the alternative of a so-to-say in line processing that can dispense with the data store 120. Specifically, the obtained and processed information is passed directly from module 110 to module 130, and from there to module 140. For the remainder, the functionality and configurations of the shown elements follow that as disclosed in conjunction with the other embodiments of the present invention, which is the reason why like reference numerals denote like elements.

Figure 2A:
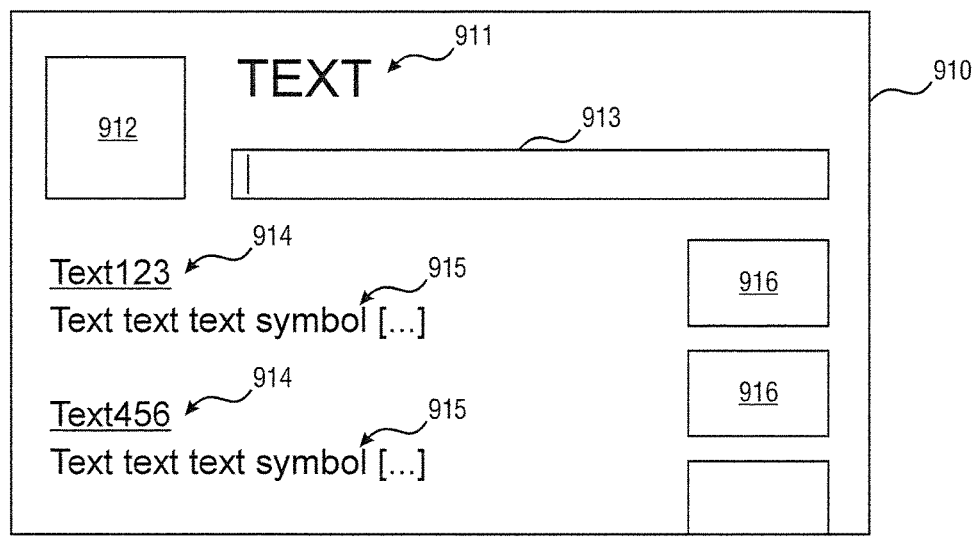
FIGS. 2A and 2B show schematic views of web pages containing links and content according to further embodiments of the present invention.

FIG. 2A shows a schematic view of a web page containing links and content according to an embodiment of the present invention. Specifically, a source web page is shown with a section 910 appearing on, for example, a display device of the corresponding user terminal. As usual, a web page features various objects of various types, such as text elements 911, 915, image, graphical, or animated elements 912, 916, or input fields 913 which allow the user to enter data for example by means of a physical or virtual keyboard. A common example for the web page shown in FIG. 2A can be one of a search engine that allows a user to enter one or more search keywords in input field 913 and, in response to requesting a search of the entered keywords, display one or more search results in the form of links 914 and accompanying text 915 or image, graphical or animated content 916. Usually, a linked text element 914 is displayed in an underlined type face with optional additional properties, such as different colors (e.g. blue) and/or a changing behavior of a pointer when moving across link element 914.

In an exemplary scenario, the user selects the top most link element 914 ("Text123") and, with this, requests another web page. This web page is requested from the respective server and the field of view may change to that as shown in conjunction with FIG. 2B. This second field of view 920 now shows a part of another web page ("TEXT123"). Again, this web page may comprise the usual web page elements, such as a graphical or animated element 922, a further text element 923, and, of course, also further link elements, such as the link element 924.

In general, a HTTP referrer is an optional HTTP header field that identifies the address of a unique resource location (URL) that linked to the current request. When someone visits a web page via a hyperlink embedded in a previous visited web page, by default, every major browser reports the URL of the previous page. Therefore, an analysis of the HTTP requests informs what pages "referred" to links in the current page. Many web servers log HTTP referrers and use analytical tools to process this information for different purposes e.g. business intelligence reports. Referrer analysis is also offered as a service by web analytics companies. Although HTTP referrers has been one of the main sources used for web marketing and business intelligence tools, there exists the possibility to remove the HTTP referrer of the HTTP requests due to privacy concerns.

As a possible result, website owners may lose valuable data that they depend on to understand which keywords are leading the users to the website via search. Further, web site owners may have implemented (and paid for) existing web analytics tools to process this type of information. However, without a proper use of the referrer information, the related investments would be of course waist. Furthermore, also social media websites have recently implemented a solution to hide part of the HTTP referrer claiming privacy protection. Depending how on the strategies of these companies evolve, website owners may lose even the basic information about referred traffic.

The Hypertext Transfer Protocol (HTTP) is an application layer protocol for distributed, collaborative and information systems. HTTP is the foundation of data communication for the Web. The standards development of HTTP was coordinated by the IETF and the W3C, culminating in the publication of a series of RFC's, most notably RFC 2616 (June 1999), which defines HTTP/1.1, the version of HTTP in common use. More specifically, HTTP functions as a request-response protocol in the client-server computing model. The client submits an HTTP request message to the server and the server, which provides resources such as HTML files and other content, or performs other functions on behalf of the client, returns a response message to the client. The response contains completion status information about the request and may also contain requested content in its message body.

Figure 2B:
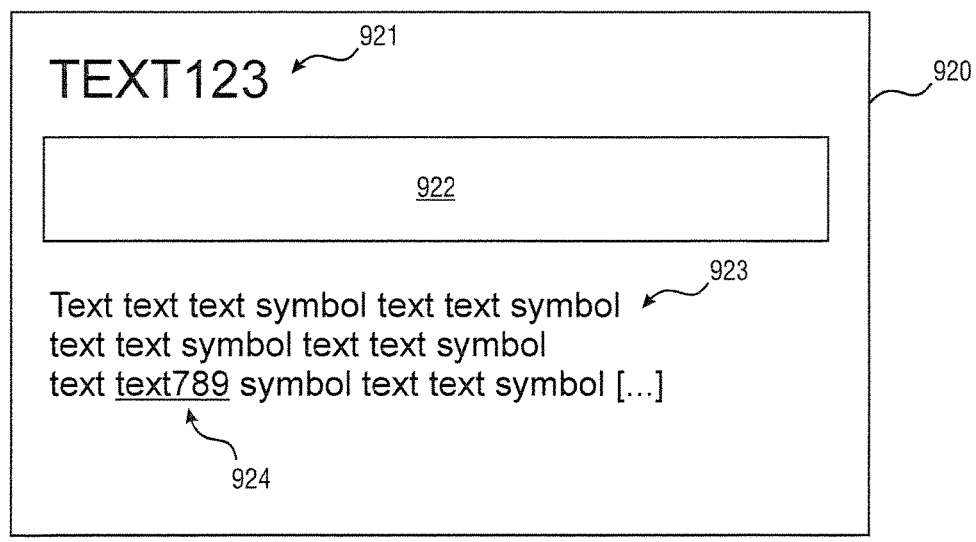

HTTP referrer is an HTTP header field that identifies the address of a URL that linked to the current request. When visiting a web page, by default, every major browser reports the last page that viewed before clicking over to the current page, i.e., what page "referred" to the current page. For example, someone employs a search engine looking for the keyword "xyz" and gets a page of search results (the URL associated to the search page may look like "http://www.g . . . com/search?q=xyz"). The last part of the URL after the interrogation sign "?" informs the search keyword(s) that have been used. If one of the links (e.g. 914 in FIG. 2A) listed in the search page result is clicked, the browser will request that new web page (as shown in FIG. 2B). In the HTTP request, the browser may also send a copy of the URL above as an HTTP referrer, showing how the client has arrived to this page, in this example, through a search with a specific keyword.

In another example, a user searches the keywords "news in London" and gets as a result the page with the URL "http://www.a . . . com/#output=search&sclient=psy-ab&q.news+ . . . " When one of the links (e.g. the top most 914 in FIG. 2A) to is clicked, an HTTP request is sent from the browser to the server associated to that web page.

In the case of social media, redirection mechanisms can be used in order to protect their user's privacy. In this case, the specific referrer associated to the URL may not be reported, but a single domain name to inform the content is being accessed.

In general, the HTTP referrer allows a website owner to know how their website visitors arrived to their sites. It is to be noted, however, that referrer data is only sent if a link is clicked from one page to the next. If a page is visited "manually", then a new URL is typed directly into browser, or a bookmark is used, and the "old" address is not sent. This kind of web page visits is considered as a direct visit in contrast to a referred visit.

Many websites log HTTP referrers and use analytical software to process this information, in order to track their users and obtain business intelligence. As a website owner, it may be important to understand the search terms visitors used to reach the site, and understand how successful search marketing activities are, and target those people with a message when they arrive. Aside from search terms, understanding exactly how people are finding a web site tells one what marketing strategy is working properly or not. There is thus a measure whether users are attracted through ads, through mentioning in news reports, through the URL being passed around on social networks, and which other web sites are linking to the site.

HTTP referrer can be important to many website owners for marketing analysis. However, there are several threats to remove the HTTP referrer due to privacy concerns. One way is to block referrer data including keywords for logged-in users. Basically, the situation could look like that the referrer header sent is "www.g . . . com/search?not_provided" instead of "www.g . . . com/search?q=xyz". In general, website owners may begin to lose valuable data that they depend on, to understand how their sites are found through search engines, using which keywords.

At the same time, some browsers also start to introduce settings which allow users to hide the HTTP referrer header for all web page visits letting the HTTP referrer header empty. This is an initiative to protect user privacy. Moreover, browsers may also hide the referrer header by default, implying that, if a user is using a browser with this setting, the website owner will have no clue on where does the user come from. In summary, HTTP referrers can still be sent via HTTP requests to the website owners, but their reliable use cannot be taken for granted.

Figure 3A:
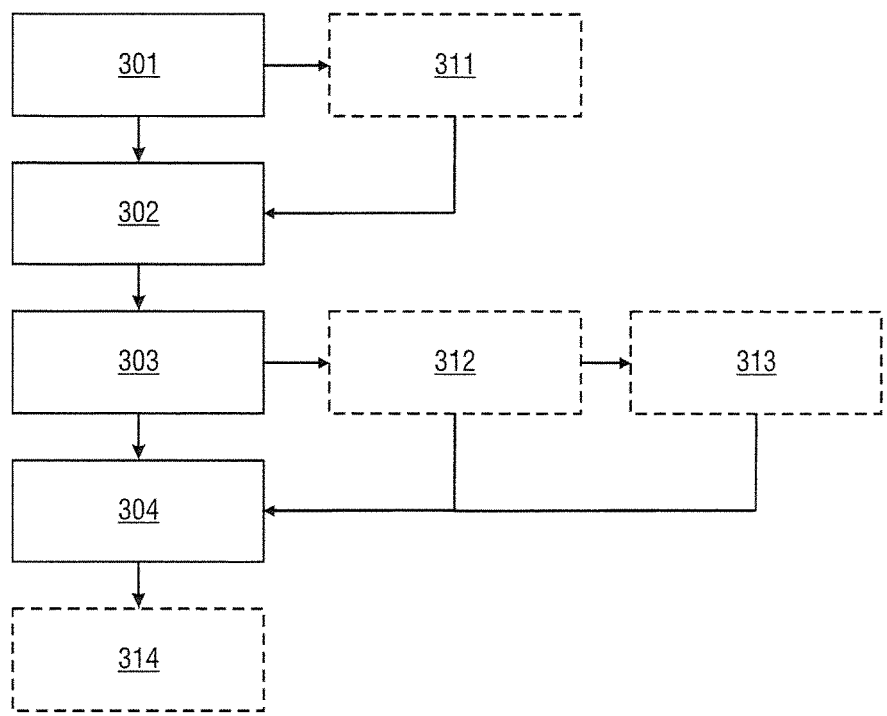

FIG. 3A shows a flow chart of a method embodiment of the present invention. Implementations of this embodiment obtain information on navigation behavior of users accessing web pages. This method embodiment comprises a step 301 of obtaining information on web page sessions. This information on web page sessions may include, for example, information on links contained in a web page, information on a request for accessing a web page and the like. The method embodiment also comprises a step 302 of correlating information of at least two web page sessions for one user from the obtained information and a step 303 of extracting information on links from the correlated information of the at least two web page sessions. Based on the extracted information and the correlated information, information on navigation behavior of the user can be inferred in a step 304.

Optionally, a step 311 of processing a referrer header of a web page session may follow or may be part of step 301 for determining whether the information on navigation behavior can be extracted from the referrer header directly. This may be the case if the HTTP referrer header is still complete, so that information on what source web page has referenced what target web page is still contained. If the HTTP referrer header is, however, incomplete, the method continues with step 302 onwards.

Further, the step 303 may be followed by a step 312 of obtaining links for a web page session without constructed links at the DPI probe, in the sense that the missing information is complemented at a later instance. For example, the information on one web page session allows one for determining one accessed web page but has no information whether or what links there are in the accessed web page. In step 312 this missing links information is obtained, for example, by a step 313 of accessing the accessed web page for obtaining the links, i.e. the web page accessed by the user is also visited by one of the involved modules so as to determine what links there are in the accessed web page.

In step 304 the information on navigation behavior of the user is inferred. This information can be on a level of individual users or in more anonymous form in the sense of indicating web page references and links only in terms of numbers of users, accesses, and requests. Finally, the information on navigation behavior of the user may also be used in an optional step 413 of filling a referrer header for one web page session based on the inferred information on navigation behavior of the user. In this way, implementations of the present invention may cooperate with existing web analysis solutions which rely on sensible information in an HTTP referrer header.

FIG. 3B shows a flow chart of a further method embodiment of the present invention. Specifically, this method embodiment may be implanted in one of the HTTP referrer analytics modules 130 as disclosed in conjunction with FIG. 1B or 1C. According to this embodiment, a corresponding HTTP referrer analytics module is configured to analyze web page logs from a web data store or an inspection module. For web sessions with no or incomplete HTTP referrer, it can re-construct the referrer header for this the web session, and the result can be written back to the web data store or forwarded to any kind of reporting module (e.g. module 140). In the context of the present disclosure, an incomplete HTTP referrer is one with only partial HTTP referrer information is available, for example, in the case the referrer still shows the originating search engine, but does not provide search keywords.

More specifically, an HTTP referrer analytics module is configured according to this embodiment to perform a step 322 of sorting all web page sessions first by user, and then by start time, and then to loop through all the web page sessions under consideration in steps 323, 329, 331, and 332. For each web page session, if it is determined in step 324 that the HTTP referrer is not available or incomplete, the algorithm tries construct the complete HTTP referrer for this session by continuing to step 325; otherwise it performs the next loop instance in step 329. In step 325, a number of web sessions prior at session X by the same user is found, and—optionally—sorted by time, and with the most recent entry first. It is to be noted that the exact number of sessions to be analyzed can be a configuration parameter of the system.

In step 326 it is then gone through the list of web sessions L, for each web page session Y prior to session X, and checked if any of the links in session Y is equal to the web server URL of session X. If the links of session Y is empty, which means that it is not set with the DPI probe in the web session mining module, the links of session Y needs to be obtained in step 330 (cf. also steps 312 and/or 313 as disclosed in conjunction with FIG. 3A). A way to do this is to perform active HTTP request to the web page URL, and parse the received web contents to obtain the links.

If there is a match in step 327 between session Y's links and session X's web server URL, it shows that there is a potential link from session Y to session X. In this case, the HTTP referrer of session X is set to the server URL of session Y in step 328. If a match is not found, the algorithm continues to the next web page session in list L (i.e. 322, 323, and so forth). If no matching is found after analyzing all web page sessions in list L, then the original HTTP referrer may be kept unchanged.

Taking the web page sessions of the above table as an example, it is tried to analyze the HTTP referrers for all the sessions. First, it could be seen that the HTTP referrer of web session 2 (ID=2) is incomplete, as a search keyword is not provided. Also, web page sessions 3 and 4 are without any HTTP referrer. Therefore, it is web page sessions 2, 3, and 4 that need to be analyzed. When analyzing web page with Session ID=2 with Server URL=www.y . . . com, it could be seen that in the session with ID=1, the same user performed a search on news at www.g . . . com, and the links column shows that search result includes the www.y . . . com. Therefore, it can be assumed that the user arrived at www.y . . . com through www.g . . . com with a specific key word, such as "news". Therefore, we can set the HTTP referrer for web page with Session ID=2 to the web URL of Session ID=1 www.g . . . com/search?q=news.

For the third session to www.a . . . com, there is no session prior to it from the same user, therefore, nothing can be done to construct the HTTP referrer. For the fourth session to www.m . . . com, it could be observed that the user visited www.a . . . com shortly before, and from www.a . . . com there is actually an outgoing link to www.m . . . com Therefore, we can set the HTTP referrer of www.m . . . com to www.a . . . com. In other words, a time correlation is performed (i.e. two sessions within a predetermined or dynamically varying threshold time interval) together with an obtaining of links comprised in the source web page.

After analyzing the referrers of all web sessions, the referrer analytics module may update the HTTP referrer header in the web session log, and writes backs the results into the web data store. The second table below shows updated (bold face) session ID entries:

| ID | Client IP | time | Server URL | HTTP referrer | Links |
|---|---|---|---|---|---|
| 2 | 10.0.0.1 | 10:02 | news.y . . . com | www.g . . . com/ search? q=news | news.y . . . 1 . . . news.y . . . 2 . . . |
| 4 | 10.0.0.2 | 10:03 | www.m . . . com | www.a . . . com | www.m . . . uv . . . |

Figure 4:
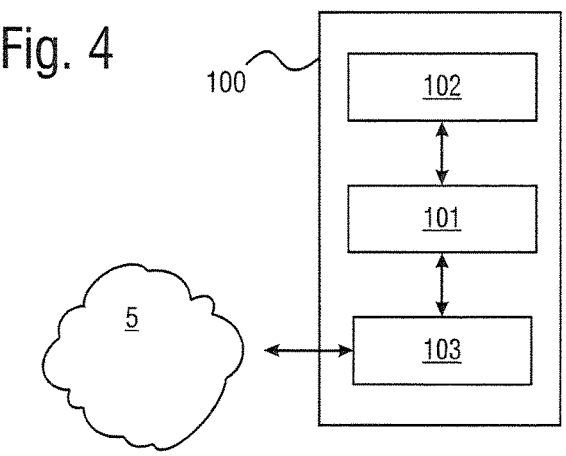
FIG. 4 shows a schematic view of an entity embodiment of the present invention.

FIG. 4 shows a schematic view of an entity embodiment of the present invention. According to the embodiments of the present invention, an entity, module or unit is associated with a given specific functionality. In a way, an entities, modules and units are thus able to provide this functionality and may thus involve respective processing, communication and memory resources. These resources may be collocated in one unit, such as a server, a computer or a processor board, but they may also well be distributed over a network or a data center. In a way, an entity, a module or a unit may also be the collection of code and application data that is for providing the respective functionality.

FIG. 4 shows such an entity 100 with processing resources that include a processing unit 101, a memory unit 102, and a communication unit 103. The latter communication unit 103 can be in particular arranged to communicate with a network, such as internet 5, for obtaining any desired information (e.g. from packet inspection) and/or exchanging data to other entities, such as data stores or report targets. More specifically, the memory unit 102 may store code so as to instruct the processing unit 101 to implement one or more method embodiments of the present invention. In this way, an obtaining of information on navigation behavior of users accessing web pages can be implemented by storing code in the memory resources 102 that configures the processing resources 101 to obtain information on web page sessions, correlate information of at least two web page sessions for one user from the obtained information, extract information on links from the correlated information of the at least two web page sessions, and to infer information on navigation behavior of the user based on the extracted information and the correlated information.

Embodiments of the present invention may in particular provide the advantage to allow website owners to have access to information about their referred traffic and/or search keywords using data available at the CSP's premises despite any trends of web browsers and/or internet companies to remove HTTP referrers. Although detailed embodiments have been described, these only serve to provide a better understanding of the invention defined by the independent claims, and are not to be seen as limiting.

The invention claimed is:

1. A method of constructing a referrer header of a web page session by obtaining information on navigation behavior of users accessing web pages, the method comprising the steps of:
   capturing data packets of web page sessions exchanged between a user terminal and a server of a content service provider network;
   processing the captured data packets to obtain information on the web page sessions;
   correlating information of at least two web page sessions for one user based on the obtained information on web page sessions;
   extracting information on links from the correlated information of the at least two web page sessions; and
   responsive to determining a referrer header of one web page session of the at least two web page sessions is unfilled or incomplete:
      inferring information on navigation behavior of the user based on the extracted information on the links and the correlated information of the at least two web page sessions for the one user; and
      filling the referrer header of the one web page session based on the inferred information on the navigation behavior of the user.

2. The method of claim 1, wherein the step of processing the captured data packets to obtain the information on the web page sessions comprises a deep packet inspection procedure performed to inspect the captured data packets related to the web page sessions.

3. The method of claim 1, wherein:
   the step of correlating information of at least two web page sessions comprises
   a procedure of sorting information on the at least two web page sessions by their respective access time.

4. The method of claim 3, wherein the procedure of sorting information on web page sessions for the one user comprises a procedure of identifying a user based on one or more access IP addresses.

5. The method of claim 1, wherein the step of inferring information on navigation behavior of the user comprises at least one of:
   a procedure of comparing access times of the at least two web page sessions for the one user; and
   a procedure of determining whether a link extracted for one of the at least two web page sessions points to a web page of another web page session.

6. The method of claim 1, wherein the method further comprises a step of processing a referrer header of a web page session.

7. The method of claim 1, wherein the step of extracting information on links comprises a procedure of determining whether there are no links for one of the at least two web page sessions.

8. The method of claim 7, wherein the method comprises a step of obtaining links for the web page session without links.

9. The method of claim 8, wherein the method comprises a step of accessing a web page for obtaining links included in the web page session.

10. A computer program product comprising a non-transitory computer readable storage medium storing code that when executed by a processor causes the processor to operate performing the method of claim 1.

11. The method of claim 1, wherein the referrer header of the one web page is incomplete; and
   wherein filling the incomplete referrer header of the one web page session based on the inferred information comprises reconstructing the incomplete referrer header using the inferred information to construct a complete referrer header for the one web page session.

12. The method of claim 11, wherein the step of updating the web session log of the one web page session in the web data store comprises writing back the complete referrer header to the web data store for the one web page session.

13. The method of claim 1, further comprising:
   updating a web session log of the one web page session in a web data store of the content service provider network with the filled referrer header.

14. A computer entity that constructs a referrer header of a web page session by obtaining information on navigation behavior of users accessing web pages, the computer entity comprising:
   a processor; and
   a memory coupled to the processor and comprising computer readable program code that when executed by the processor causes the processor to perform operations comprising:
   capturing data packets of web page sessions exchanged between a user terminal and a server of a content service provider network;
   processing the captured data packets to obtain information on the web page sessions;
   correlating information of at least two web page sessions for one user based on the obtained information on web page sessions;
   extracting information on links from the correlated information of the at least two web page sessions; and
   responsive to determining a referrer header of one web page session of the at least two web page sessions is unfilled or incomplete:
      inferring information on navigation behavior of the user based on the extracted information on the links and the correlated information of the at least two web page sessions for the one user; and
      filling the referrer header of the one web page session based on the inferred information on the navigation behavior of the user.

15. The entity of claim 14, wherein the processing resources comprise a processing unit, a memory unit, and a communication unit.

16. The computer entity of claim 14, wherein the operation of processing the captured data packets to obtain the information on the web page sessions comprises a deep packet inspection procedure performed to inspect the captured data packets related to the web page sessions.

17. The computer entity of claim 14, wherein:
the operation of correlating information of at least two web page sessions comprises
a procedure of sorting information on the at least two web page sessions by their respective access time.

18. The computer entity of claim 17, wherein the procedure of sorting information on web page sessions for the one user comprises a procedure of identifying a user based on one or more access IP addresses.

19. The computer entity of claim 14, wherein the operation of inferring information on navigation behavior of the user comprises at least one of:
a procedure of comparing access times of the at least two web page sessions for the one user; and
a procedure of determining whether a link extracted for one of the at least two web page sessions points to a web page of another web page session.

20. The computer entity of claim 14, wherein the method further comprises a step of processing a referrer header of a web page session.

21. The computer entity of claim 14, wherein the step of extracting information on links comprises a procedure of determining whether there are no links for one of the at least two web page sessions.

22. The computer entity of claim 21, wherein the method comprises a step of obtaining links for the web page session without links.

23. The computer entity of claim 22, wherein the method comprises a step of accessing a web page for obtaining links included in the web page session.

24. A system, comprising:
a user terminal configured to communicate via a communication path to a server, and
a computer entity that constructs a referrer header of a web page session by obtaining information on navigation behavior of users accessing web pages, the computer entity comprising:
a processor; and
a memory coupled to the processor and comprising computer readable program code that when executed by the processor causes the processor to perform operations comprising:
capturing data packets of web page sessions exchanged between a user terminal and a server of a content service provider network;
processing the captured data packets to obtain information on the web page sessions;
correlating information of at least two web page sessions for one user from based on the obtained information on web page sessions;
extracting information on links from the correlated information of the at least two web page sessions; and
responsive to determining a referrer header of one web page session of the at least two web page sessions is unfilled or incomplete:
inferring information on navigation behavior of the user based on the extracted information on the links and the correlated information of the at least two web page sessions for the one user; and
filling the referrer header of the one web page session based on the inferred information on the navigation behavior of the user.

* * * * *